United States Patent
Reinheimer et al.

(10) Patent No.: US 7,479,513 B2
(45) Date of Patent: Jan. 20, 2009

(54) USE OF THERMALLY EXPANDABLE GRAPHITE INTERCALATION COMPOUNDS FOR PRODUCING FIRE-PROTECTION SEALS AND METHOD FOR THEIR PRODUCTION

(75) Inventors: Arne Reinheimer, Zellerberg (DE); Antje Wenzel, Hofstetten (DE); Herbert Muenzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 679 days.

(21) Appl. No.: 10/869,419

(22) Filed: Jun. 16, 2004

(65) Prior Publication Data
US 2004/0256605 A1 Dec. 23, 2004

(30) Foreign Application Priority Data
Jun. 18, 2003 (DE) ................. 103 29 889

(51) Int. Cl.
*C09K 21/08* (2006.01)
*C09K 21/10* (2006.01)
*C09K 21/14* (2006.01)
*C08J 3/20* (2006.01)
*C08K 3/04* (2006.01)

(52) U.S. Cl. ............... 523/179; 524/179; 524/259; 252/606; 252/609; 252/378 R (58) Field of Classification Search ........... 252/606, 252/378 R; 523/179; 524/259, 256
See application file for complete search history.

(56) References Cited

U.S. PATENT DOCUMENTS

| | | | | |
|---|---|---|---|---|
| 3,514,337 A | * | 5/1970 | Braeuer et al. | 429/337 |
| 3,880,944 A | * | 4/1975 | Lalancette | 585/460 |
| 3,925,495 A | * | 12/1975 | Rodewald | 585/371 |
| 3,984,352 A | * | 10/1976 | Rodewald | 502/181 |
| 4,035,434 A | * | 7/1977 | Rodewald | 528/408 |
| 4,083,885 A | * | 4/1978 | Rodewald | 585/458 |
| 4,119,655 A | * | 10/1978 | Hulme | 252/506 |
| 4,202,986 A | * | 5/1980 | Shawl | 560/25 |
| 4,388,227 A | * | 6/1983 | Kalnin | 252/510 |
| 4,799,956 A | * | 1/1989 | Vogel | 75/243 |
| 4,808,475 A | * | 2/1989 | Matsumura et al. | 428/367 |
| 5,173,515 A | | 12/1992 | von Bonin et al. | |

(Continued)

FOREIGN PATENT DOCUMENTS

DE 4135678 5/1993

OTHER PUBLICATIONS

English Language Translation of Chinese Patent Application No. 87106070.1 Publication date Apr. 12, 1989, entitled: "Process for preparing scale graphite with high expanded ratio".*

*Primary Examiner*—Joseph D Anthony
(74) *Attorney, Agent, or Firm*—Abelman, Frayne & Schwab (57) ABSTRACT

The method of at least one thermally expandable graphite intercalation compound, containing
A) a least one metal halide of at least one of the elements Fe, Al, Sb, Zn, Y, Cr and Ni and
B) at least one nitroalkane of the general formula $CH_3(CH_2)_n NO_2$, in which n is a whole number from 0 to 10, as well as its structural isomers or mixtures,
as intumescing, fire-protection additive in polymer matrices for producing intumescing fire-protective seals for through holes, wall bushings and other openings in walls, floors and/or ceilings of buildings, as well as a method for preparing the thermally expandable graphite-intercalation compounds used.

24 Claims, 4 Drawing Sheets

U.S. PATENT DOCUMENTS

| | | | | |
|---|---|---|---|---|
| 5,352,524 | A | * | 10/1994 | Nagata ........................ 428/408 |
| 5,376,450 | A | * | 12/1994 | Greinke et al. ............... 428/402 |
| 6,149,972 | A | * | 11/2000 | Greinke ....................... 427/220 |
| 6,406,612 | B1 | * | 6/2002 | Greinke ....................... 205/555 |
| 6,669,919 | B1 | * | 12/2003 | Greinke ....................... 423/448 |
| 7,118,725 | B2 | * | 10/2006 | Reinheimer et al. ......... 423/448 |
| 2003/0157015 | A1 | | 8/2003 | Reinheimer et al. |

* cited by examiner

USE OF THERMALLY EXPANDABLE GRAPHITE INTERCALATION COMPOUNDS FOR PRODUCING FIRE-PROTECTION SEALS AND METHOD FOR THEIR PRODUCTION

FIELD OF INVENTION

The object of the present invention is the use of thermally expandable graphite intercalation compounds as intumescing fire-protection additives in polymer matrices for producing intumescing fire protection seals for through holes, wall bushings and other openings in walls, floors and/or ceilings of buildings, as well as to a method for producing the thermally expandable graphite intercalation compounds used.

BACKGROUND INFORMATION AND PRIOR ART

For purposes of fire protection, through holes, wall bushings and other openings in walls, floors and/or ceilings of buildings must be provided with fire-protection seals, so as to prevent fire and smoke from spreading out through these openings in the event of a fire. Such fire-protection seals may be used in the form of curable, formless fire-protection compositions or in the form of prefabricated strips, rings, panels and the like, which are introduced into the openings, which are to be sealed off, or with which these openings are covered.

Intumescing compositions for such fire-protection seals usually contain expandable graphite intercalation compounds, also known as expandable graphite, as intumescing fire-protection additive and are commercially available.

Intumescing, fire-protection compounds are compounds, which contain the following exogenous components (intercalates) intercalated between the lattice layers of the graphite. Such expandable, graphite intercalation compounds usually are produced by dispersing graphite particles in a solution, which contains an oxidizing agent and the guest compound, which is to be intercalated. Usually, nitric acid, potassium chlorate, chromic acid, potassium permanganate, hydrogen peroxide and the like are used as oxidizing agent. Concentrated sulfuric acid, for example, is used as a compound, which is to be intercalated, the reaction being carried out at a temperature from 60° to 130° C. for up to four hours (see, for example, EP-B-0 085 121). Alternatively, it is also possible to intercalate metal chlorides in the graphite in the presence, for example, of chlorine gas (E. Stumpp, Physica (1981), 9-16).

A further method for producing such sulfuric acid-graphite particles is known, for example, from U.S. Pat. No. 4,091,083. The method includes dispersing crystalline graphite particles in sulfuric acid, stirring the mixture with the addition of hydrogen peroxide and continuing the stirring until the sulfuric acid has been intercalated in the graphite. Subsequently, the excess acid is separated, the remaining acid, present in the solid product, is removed by washing repeatedly with water and the material is dried.

When heated to a temperature above the so-called onset temperature, the expandable graphite intercalation compounds or expandable graphite expand greatly with expansion factors of more than 200. The expansion is caused owing to the fact that the compounds, intercalated in the layer structure of the graphite, are decomposed by the rapid heating to this temperature with the formation of gaseous materials, as a result of which the graphite particles are expanded perpendicularly to the layer plane (EP-B-0 085 121).

This expansion behavior is utilized in intumescing compositions, which are used, for example, for the fire-protection sealing of cable and pipe wall bushings through walls and ceilings of buildings. In the event of a fire, the graphite particles expand when the onset temperature is reached, as does the intumescing composition sealing the wall bushing, so that, even if the cable and/or plastic pipe passed through the wall bushing has burned away, the fire is prevented or delayed from breaking through the wall bushing.

Figure 1A:
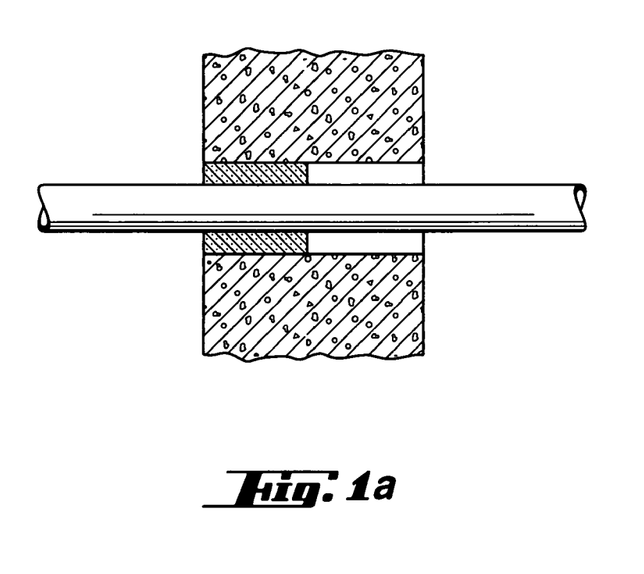
FIG. 1 shows possible fire-protection seals using a pipe compartmentalization as example, installed in a wall (FIG. 1a) or on the wall (FIG. 1b)
Figure 1B:
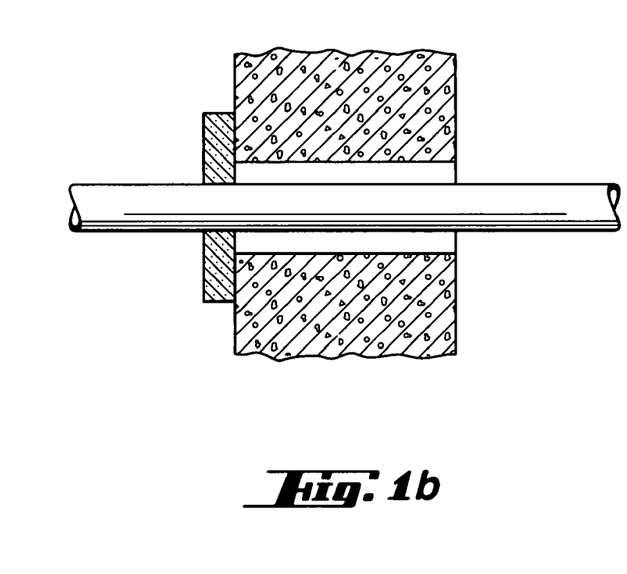

For the fire-protection sealing of through holes, wall bushings and other openings in walls, floors and/or ceilings of buildings, it is now possible, on the one hand, to introduce the fire-protection seal into the opening, such as an annular gap, about a plastic pipe passed through the wall, as shown in FIG. 1a of the attached drawing, or to provide it in the form of a covering on the wall, as shown in FIG. 1b. Problems arise in the remaining annular gap if the fire-protection seal is provided as a compartmentalization, as shown in FIG. 1a. or if the fire protection seal is covered by the building construction, owing to the fact that, in this case, the heat input in the event of a fire, by means of which the expansion of the intumescing fire-protection additive in the fire-protection composition is initiated, is accomplished over a relatively small surface, namely the front side of the fire-protection sealing, present in the annular gap, in the case of FIG. 1a), whereas, in the case that the fire-protection seal is applied on the wall, the intumescing fire-protection composition is exposed to the high heat of the fire over a large area.

Since plastic pipes, for example, which are passed through the wall bushing, collapse almost equally rapidly in both cases in the event of a fire, problems arise in the event that the fire-protection composition is introduced into the opening itself owing to the fact that, if the sealing material, present in the opening, collapses before the onset temperature of the intumescing fire-protection composition is reached, fire and smoke can break through the opening.

This is the case especially with conventional, intumescing fire-protection seals, which contain the usually employed, expandable graphite as intumescing fire-protection additive, since the characteristic values of the expansion behavior of the latter are not satisfactory especially for this application. In this connection, the characteristic values are the onset temperature of the expandable graphite, that is, the temperature, at which the expansion of the particles of the expandable graphite commences. Furthermore, the expansion rate in the region of the onset temperature, the maximum attainable expansion volume and the average expansion coefficient are important. Reference is made further below to precise definitions for determining these expansion parameters.

According to the state of the art, commercially obtainable sulfuric acid-graphite particles are used predominantly as intumescing fire-protection additives in such intumescing fire-protection seals, which have an onset temperature of 200° C. Admittedly, modified sulfuric acid-graphite particles are also obtainable commercially, which have a low onset temperature of 150° C. or 160° C., however, they are not satisfactory with respect to the expansion volume and the expansion rate. The expansion parameters of two typical, commercial, expandable graphite types are listed in the following Table 1:

TABLE 1

Expansion parameters of two typical, commercial, expandable graphite types (particle size 250-400 μm, isolated by dry screening)

|  | Sulfuric Acid Graphite | Sulfuric acid Nitric acid Graphite |
|---|---|---|
| Onset (° C.) | 200 | 160 |
| Volume or sample weight in %/mg | 245 | 192 |
| $T_{100}$ in ° C. | 361 | 268 |
| Rate in the onset 1 range in %/° C. | 8 | 13 |
| Rates between onsets 1 and 2%/° C. | — | 3 |
| Rate in the onset 2 range in %/° C. | — | 29 |
| Average expansion coefficient between TMA onset 1 and $T_{100}$ in $K^{-1}$ | 0.09 | 0.11 |

It has now turned out that, when such commercial, expandable graphites are used and the fire-protection seal is introduced into the interior of the openings that are to be closed off, the expansion parameters of the conventional commercial expandable graphites are not adequate for the, in this case, small heat input, to initiate the intumescence of the fire-protection seal sufficiently rapidly and to achieve a corresponding increase in volume, so that fire-protection sealing is ensured even if the plastic pipe, passed through the opening, collapses.

OBJECT OF THE INVENTION

It is an object of the present invention to make an intumescing fire-protection sealing available, with which, in the event of a fire, openings can be closed off significantly better even at lower temperatures and under unfavorable conditions for transferring heat to the intumescing fire-protection composition, so that larger openings and pipes with thicker walls and a large cross-section can also be sealed off reliably.

SUMMARY OF THE INVENTION

It has now been found that the expandable graphites, which are used as intumescing fire-protection additives, have a particle size of 250 to 400 μm and are isolated by dry screening, must have the following expansion parameters, listed in Table 2. for use in fire-protection seals, which are to be introduced into openings that are to be sealed off or covered by the construction.

TABLE 2

| Onset (° C.) | $\leq 160$ |
|---|---|
| Volume or sample weight in %/mg | $\geq 550$ |
| Rate in the onset range in %/° C. | $\geq 20$ |
| Average expansion coefficient between TMA onset 1 and $T_{100}$ in ° $K^{-1}$ | $\geq 0.1$ |

The adjustment of these expansion parameters by way of the particle size of the graphite particles, in that larger graphite particles, for example, result in a higher expansion volume, is not suitable, since larger graphite particles can be damaged and broken down more easily than smaller graphite particles under the shear forces occurring during the production of the intumescing fire-protection seal for introducing the fire-protection additives into the polymer matrices, for example, by injection molding, extrusion, mixing processes, etc. Usually the graphite particles are broken as a result and this is associated with corrosion of machines and tools by the acid, released from the expandable graphite particles, as well as with an undesirable reaction of the acid released with other components of the formulation and with an impairment of the expansion behavior.

It is a further object of the following invention to ensure the intumescing behavior of the intumescing fire-protection seals while the particle size of the intumescing fire-protection additive remains constant and conventional.

Surprisingly, it has turned out that this objective can be accomplished pursuant to the invention by the use of thermally expandable graphite intercalation compounds containing at least one defined metal halide and at least one nitroalkane as intumescing fire-protection additive in polymer matrices for the production of intumescing fire-protection seals.

The object of the present invention therefore is the use according to claim 1. A further object of the invention relates to a method for producing the thermally expandable graphite intercalation compounds, which are to be used pursuant to the invention. The dependent claims relate to preferred embodiments to the inventive object.

The invention therefore relates to the use of at least one thermally expandable graphite intercalation compound, containing A) at least one metal halide of at least one of the elements Fe, Al, Sb, Zn, Y, Cr and Ni and
B) at least one nitroalkane of the general formula $CH_3(CH_2)_n NO_2$, in which n is a whole number from 0 to 10. as well as its structural isomers or mixtures, as intumescing, fire-protection additive in polymer matrices for producing intumescing fire-protective seals for through holes, wall bushings and other openings in walls, floors and/or ceilings of buildings.

In accordance with a preferred embodiment, the graphite intercalation compound additionally contains at least one representative of the group of acids comprising sulfuric acid, acetic acid and nitric acid, as intercalate compound and preferably at least one of the following acid combinations: sulfuric acid and nitric acid, sulfuric acid and acetic acid and/or acetic acid and nitric acid mixtures. In accordance with a further inventive embodiment, the graphite intercalation compound contains at least one hydrate of at least one of the metal halides $FeCl_3$, $AlCl_3$, $SbCl_5$, $ZnCl_2$, $YCl_3$, $CrCl_3$ and $NiCl_2$ as intercalation compound of group A), especially an $FeCl_3$ hydrate of the following formula $FeCl_3.5\,H_2O$, $FeCl_3.6\,H_2O$, $FeCl_3.7\,H_2O$, $FeCl_3.12\,H_2O$ and/or hydrolyzed $FeCl_3$ hexahydrate of the general formula $[FeCl_n(H_2O)_{6-n}]Cl_{3-n}.n\,H_2O$, in which n is a whole number with a value from 1 to 3.

Preferably, the graphite intercalation compound, used pursuant to the invention, contains nitromethane, nitroethane and 1-nitropropane or their mixtures as nitroalkane of group B.

The graphite intercalation compound, used pursuant to the invention, preferably has a particle size of 100 to 1500 μm and preferably of 125 to 1000 μm and particularly of 250 to 400 μm, the particle size range being brought about by screening.

In accordance with a particularly preferred embodiment of the invention, the graphite intercalation compound, used pursuant to the invention, has the expansion parameters given in Table 2 above, namely an onset temperature of not greater 160° C., a volume, related to the sample weight, of not less of 550%/mg, a rate in the onset temperature range of at least 20%/° C. and an average expansion coefficient between the TMA onset 1 and $T_{100}$ of at least 0.1/K.

The polymer matrices, into which the thermally expandable graphite intercalation compounds are incorporated as intumescing fire-protection additive pursuant to the present invention, preferably are plastoelastic at ambient temperature and/or have a softening point at about 120° C. In accordance with the "Praxis-Handbuch Dichtstoffe" (Practical Handbook of Sealing Materials) of the Industrieverbandes Dichtstoffe (IVD—Industrial Association of Sealing Materials), plastoelasticity is defined as the property of a material with predominantly elastic and to a lesser extent plastic properties. Elastic materials have a recovery of at least 70%. On the other hand, plastoelastic materials have a recovery of at least 40 to 70%, elastoplastic materials have a recovery of 20 to 40% and plastic materials have a recovery of less than 20%.

The softening point or also the glass transition temperature (Tg) usually is determined by means of differential scanning calorimetry (DSC) according to DIN EN ISO 111357-1. DIN 53 765 or ASTM D 3418. The softening point or the glass transition temperature of the polymer matrixes, used pursuant to the invention, is not higher than +120° C.

As polymer, the polymer matrix, used pursuant to the invention, preferably contains at least on representative of the group comprising polyurethanes, plastoelastic polyurethanes, polyvinyl acetates, polyvinyl ethers, polyvinyl propionates, polystyrenes, natural or synthetic rubbers, silicones, poly(meth)acrylates and homopolymers and copolymers based on (meth)acrylates, acrylonitrile, vinyl esters, vinyl ethers, vinyl chloride and/or styrene, as well as hybrid polymers, preferably those based on polyethylene oxide and/or polypropylene oxide with dimethylsilyl end groups. Poly (alkyl methacrylates), poly(alkyl acrylates), poly(aryl methacrylates), poly(aryl acrylates) and/or copolymers thereof with n-butyl acrylate, vinyl acrylate and/or styrene are particularly preferred as polymers for the polymer matrix.

In accordance with a furthermore preferred embodiment, the polymer matrix represents a mixture of an aqueous polymer dispersion D) and a low molecular weight, permanently plastic, liquid polymer E) with a weight ratio of D) to E) of 6:1 to 1:2.5 and preferably of 4:3 to 3.4. Moreover, the aqueous polymer dispersion D) may contain, as polymer, at least one representative of the group comprising the polyurethanes, polyvinyl acetates, polyvinyl ethers, polyvinyl propionates, polyvinyl styrenes, natural or synthetic rubbers, poly(meth) acrylates, homopolymers and copolymers based on (meth) acrylates, acrylonitrile, vinyl esters, vinyl ethers, vinyl chloride and/or styrene and preferably poly(alkyl methacrylates), poly(alkyl acrylates), poly(aryl methacrylates), polyacrylates, and/or copolymers thereof with n-butyl acrylate, vinyl acetate and/or styrene.

In accordance with a further preferred embodiment, the aqueous polymer dispersion D) has a water content of 5 to 60% by weight and preferably of 20 to 40% by weight and is contained preferably in such an amount in the matrix composition, that the polymer matrix, before it is dried, has a water content of 0.5 to 24% by weight and preferably of 1 to 20% by weight.

The low molecular weight, permanently plastic, liquid polymer E) preferably has a K value, determined according to the ISO 1628-1. of 9 to 50, or a molecular weight, derived therefrom, of 250,000 to 5,000,000 and a viscosity of 40 to 350 mPa·s measured at 23° C. in a 50% solution in ethyl acetate by the method of DIN ISO 3219. Preferred liquid polymers E) of this type are representatives of the group comprising polyurethanes, polyvinyl acetates, polyvinyl ethers, polyvinyl propionates, polystyrenes, natural or synthetic rubbers, poly(meth)acrylates and homopolymers and copolymers based on (meth)acrylates, acrylonitrile, vinyl esters, vinyl ethers, vinyl chloride and/or styrene, especially poly(alkyl methacrylates), poly(alkyl acrylates), poly(aryl methacrylates), poly(aryl acrylates), and/or copolymers thereof with n-butyl acrylate, vinyl acetate and or styrene.

In accordance with a preferred embodiment, the graphite intercalation compound of the above-defined type is contained in an amount of 1 to 75% by weight and preferably of 3 to 30% by weight in the polymer matrix.

Preferably, the polymer matrix additionally contains conventional additives F) in the usual amounts, for example, additives F1) having a cerarnizing effect, such as powdered glass, sintered glass, glass fibers, ammonium polyphosphate, zinc borate, kaolin, clay and/or bentonite, fire protection additives F2) having an ablative effect such as aluminum hydroxide trihydrate, boehmite (AlOOH), magnesium hydroxide, zinc borate and/or calcium sulfate; supplementary intumescing fire-protection additives F3) such as vermiculate, sodium borosilicate, encapsulated sodium borosilicate, melamine polyphosphate, melamine cyanurate, ethylenediamine, phosphate, guanidine, hydrazine and/or tris-2-hydroxyethyl cyanurate; and/or flame retarding fire-protection additives F4) such as brominated phosphates, cylcoaliphatic bromine compounds, aromatic bromine compounds and/or phosphate esters, as well as auxiliary materials such as water, stabilizers, pigments, fungicides, pigment dispersers, plasticizers, antifreeze agents and/or fillers.

In accordance with a preferred embodiment of the invention, the intumescing fire-protection additive exists as a curable, moldable, fire-protection composition or as a prefabricated molded object in the form of strips, rings or panels.

A further object of the invention relates to a method for producing thermally expandable graphite intercalation compounds, which are used pursuant to the invention and characterized owing to the fact that a) at least one anhydrous metal halide or metal halide hydrate of group A) is intercalated in the presence of at least one nitroalkane of group B) in graphite and optionally at least one representative of the group of intercalate compounds C), comprising sulfuric acid, acetic acid and nitric acid, is then co-intercalated or that b) at least one metal halide hydrate A), optionally in the presence of at least one nitroalkane of group B), is co-intercalated in thermally expandable graphite intercalations compounds, in which at least one representative of the group of acids C), comprising sulfuric acid, acetic acid and nitric acid, is intercalated.

Preferably, graphite intercalation compounds, in which at least one acid of group C) has been intercalated using an oxidizing agent with a redox potential $E_0$ of more than 0.55 V, is used for the co-intercalation.

In accordance with a further embodiment of the inventive method, graphite intercalation compounds, in which the at least one acid of group C) has been intercalated using hydrogen peroxide, nitric acid, an alkali metal bromate, iodate or permanganate, manganese(IV) oxide, a cerium(IV) salt and/or an alkali metal peroxydisulfate has been intercalated as oxidizing agent, is used for the co-intercalation. Preferably, graphite intercalation compounds, in which the at least one acid of group C) has been intercalated using a molar ratio of oxidizing agent to acid of group C) of 0.001 to 10 and preferably of 0.01 to 1. are used for the co-intercalation In accordance with a further embodiment of the invention, graphite intercalation compounds, in which the at least one anhydrous metal halide or metal halide hydrate of group A) and/or the at least one acid of group C) are intercalated using an organic solvent, are used for the co-intercalation, preferably chloroform, dimethylformamide, dimethyl sulfoxide, pyridine, acetic acid, trifluoroacetic acid and/or toluene being intercalated as organic solvent.

Pursuant to the invention, graphite intercalation compounds, in which the at least one anhydrous metal halide or metal halide hydrate of group A) has been intercalated by a reaction in the solid state and/or in the presence of one or more organic solvents, can be used for the co-intercalation. Preferably, graphite intercalation compounds, which were prepared using carbon tetrachloride, thionyl chloride, a nitroalkane of the general formula $CH_3(CH_2)_nNO_2$, in which n is a whole number with a value of 0 to 10. as well as its, structural isomers, especially nitromethane, nitroethane and/or 1-nitropropane, or mixtures thereof as organic solvents, were used for the co-intercalation.

Preferably, for the preparation of the thermally expandable graphite intercalation compounds used pursuant to the invention, the acids of group C) are introduced in the presence of a solvent, particularly in the presence of chloroform, dimethylformamide, pyridine, acetic acid, trifluoroacetic acid and/or toluene and, for the co-intercalation of the anhydrous metal halides or metal halide hydrates of group A), carbon tetrachloride, thionyl chloride and/or a nitroalkane of the general formula $CH_3(CH_2)_nNO_2$, in which n is a whole number with a value of 0 to 10. as well as its, structural isomers, especially nitromethane, nitroethane and/or 1-nitropropane, or mixtures thereof, are used as solvent.

In accordance with a preferred embodiment, thermally expandable graphite-sulfuric acid intercalation compounds are formed in a first step by a conventional oxidation and intercalation of sulfuric acid in graphite, optionally in a solvent suitable for this purpose. In a second step, with or without the isolation of the thermally expandable graphite-sulfuric acid intercalation compound obtained, the latter is reacted with anhydrous $FeCl_3$ or $FeCl_3$ hydrate in a solvent suitable for this purpose. The thermally expandable graphite intercalation compounds, containing sulfuric acid and $FeCl_3$ or $FeCl_3$ hydrate and the solvent, are then isolated, purified and dried.

The purification is brought about preferably by washing with a solvent, such as water or an organic solvent, preferably carbon tetrachloride, chloroform, dimethylformamide, dimethyl sulfoxide, pyridine, acetic acid, trifluoroacetic acid, toluene and/or thionyl chloride, a nitroalkane of the general formula $CH_3(CH_2)_nNO_2$, in which n is a whole number with a value of 0 to 10. as well as its, structural isomers, especially nitromethane, nitroethane and/or 1-nitropropane, or mixtures thereof.

Preferably, the reaction with anhydrous $FeCl_3$ or $FeCl_3$ hydrate is carried out at a temperature ranging from $-10°$ C. to $100°$ C. and preferably from $10°$ C. to $50°$ C. for a period of 3 minutes to 72 hours and preferably of 5 to 48 hours, sulfuric acid or $FeCl_3$ hydrate preferably being used in an amount of $1.0 \times 10^{-4}$ to 20 moles and preferably of $1.0 \times 10^{-3}$ to 10 moles per mole of graphite.

The invention is described in greater detail in the following with reference to the attached drawings in which.

The expansion properties of the sulfuric acid-graphite particles, used and produced pursuant to the invention, are measured with the help of thermomechanical analysis (TMA). Dimensional changes in the sulfuric acid-graphite particles are measured as a function of temperature and time by thermomechanical analysis (TMA). For this purpose, the sample is placed on a sample carrier and the dimensional change in the sample is measured and recorded with the help of a measuring probe as a function of the heating temperature and the heating time. For this purpose, the powdery sample of sulfuric acid-graphite particles is placed in a corundum crucible, which is covered with a steel crucible. During the expansion of the sample, the steel crucible ensures the smooth transfer of the dimensional change of the sample to the measuring probe, which is in mechanical contact with the upper side of the steel crucible and can be acted upon by an adjustable load.

The following conditions were observed for carrying out the determination of the expansion behavior using the measuring device:

| | |
|---|---|
| Temperature program: | Dynamic mode, which is preceded by an isothermal phase of 5 minutes at 25° C. |
| Heating rate: | 10°/min |
| Temperature range: | 25° C. to 500° C. |
| Analysis gas: | Synthetic air |
| Flow rate: | 50 ml/min |
| Load: | 0.06 N |
| Sample vessel: | 150 µl corundum crucible plus 150 µl steel crucible as lid |

Figure 2:
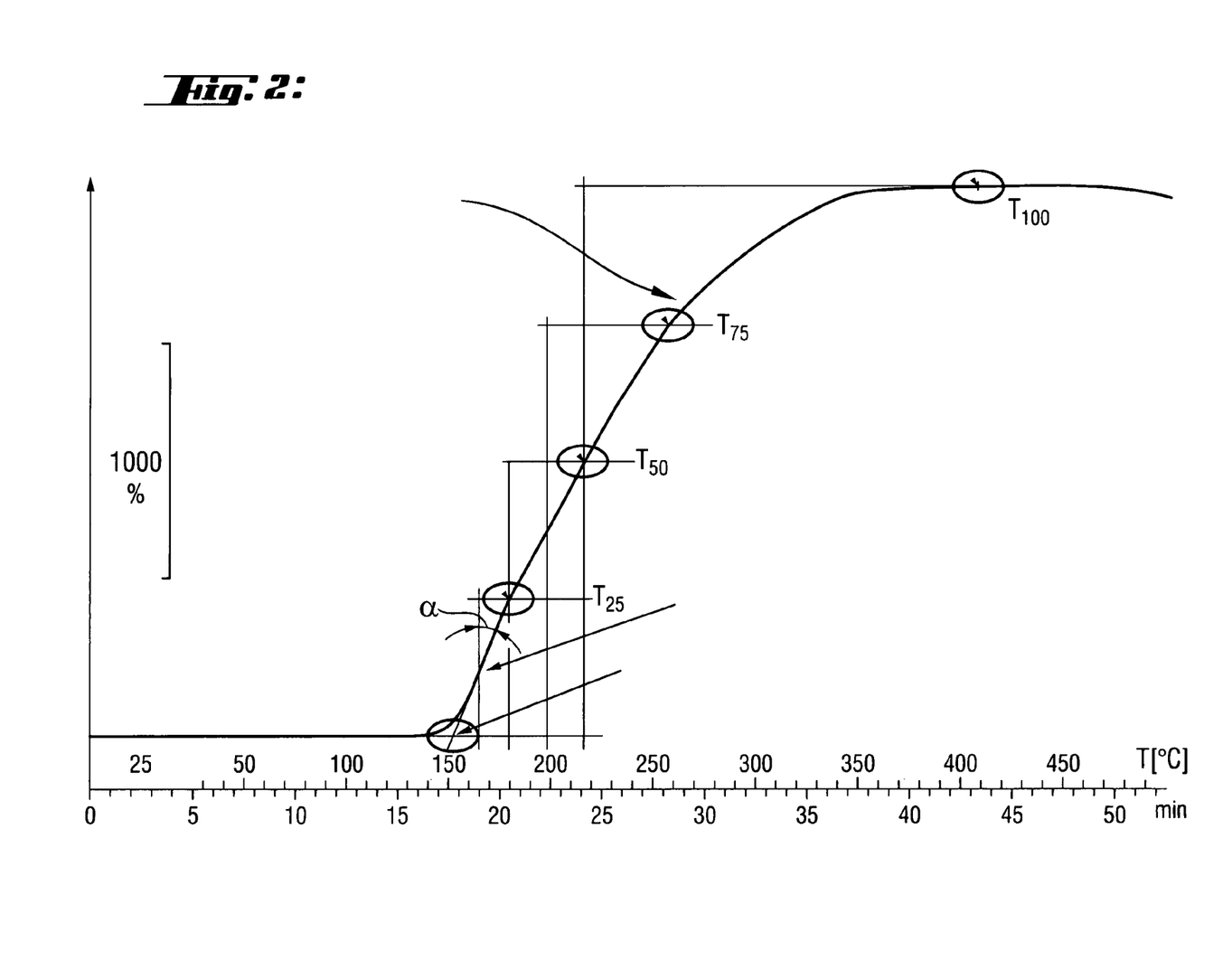
FIG. 2 shows a diagrammatic representation of a TMA curve of the expansion behavior of a graphite intercalation compound, used pursuant to the invention, obtained by thermomechanical analysis (TMA)

The TMA curve of the expansion behavior of a graphite intercalation compound, used pursuant to the invention, is obtained as a result of the thermomechanical analysis, carried out in this way and is given in FIG. 2 of the attached drawing.

As shown in FIG. 2, the onset of the sulfuric acid-graphite particles is defined mathematically as the intersection of the base line of the longitudinal change in the sample and the tangent at the point of inflection of the expansion curve.

In the region of the onset, the expansion rate of the intumescing material investigated is equal to the slope of the tangent at the point of inflection. Accordingly, the unit of the rate of expansion is %/° C.

The expansion volume corresponds to the horizontal step between the base line and the maximum of the curve. It indicates the expansion of the substance (%) or of the starting length $L_O$. Since the volume depends on the sample weight for these measurements, the expansion volume is normalized with respect to the sample weight. Consequently, the unit of expansion is %/mg. The value of $T_{100}$ indicates the temperature in ° C., at which 100% of the maximum volume is attained.

As can be seen from FIG. 2, the slope of the tangent at the point of inflection merely provides information concerning the initial expansion rate. The average expansion coefficient a in $K^{-1}$ between the onset and the maximum of the curve $(=T_{100})$ is suitable for representing the total expansion behavior. The average expansion coefficient is defined as $$\alpha = L_0^{-1} \cdot \Delta L \cdot \Delta T^{-1}$$

in which $\Delta L$ represents the change in length of the sample, which is produced by the temperature change $\Delta T$.

All measurements were carried out on graphite samples having comparable particle size distribution ranging from 250 and 400 µm. This was ensured by screening the respective graphite types.

In the following examples, the expansion parameters of the sulfuric acid-graphite particles produces are given as the normalized expansion volume, the expansion rate in the region of the onset, the average expansion coefficient and the temperature $T_{100}$.

The invention is explained further by the following examples.

As is evident from the following examples, the inventive use of the defined thermally expandable graphite intercalation compounds makes possible not only a decrease in the onset temperature, but surprisingly also a simultaneous increase in the expansion volume and the expansion rate in the region of the onset, so that the objective posed above can be accomplished, namely the attainment of the aimed-for expansion of the fire-protection seal already at low temperatures with a clearly higher expansion volume and a higher expansion rate, so that the necessary expansion of the fire-protecting seal in the event of a fire remains assured even when the intumescing fire-protection seal is used installed in the wall or behind construction elements, in which case correspondingly less heat is supplied, so that breakthrough of the fire and smoke through the opening is prevented or retarded adequately even after the cable insulation and/or the plastic pipes, passed through the wall bushing, have burned away.

EXAMPLE 1

Preparation of an $FeCl_3$/nitromethane Graphite Intercalation Compound in Nitromethane ($FeCl_3$/nitromethane GIC)

Anhydrous $FeCl_3$ (11.68 g, 0.07 moles) is dissolved in 15 ml of nitromethane in a 100 ml round-bottom flask. Subsequently, 5 g (0.42 to moles) of graphite are added and the mixture is stirred for 18 hours at room temperature. The material is washed with nitromethane as solvent, filtered with suction and dried.

The $FeCl_3$/nitromethane graphite intercalation compound obtained has a particle size of 250 to 400 µm, which was obtained by dry screening, and the expansion parameters are given in the following Table 3.

TABLE 3

|  | $FeCl_3$/Nitromethane GIC |
|---|---|
| Onset (° C.) | 150 |
| Volume or sample weight in/mg | 570 |
| Rate in region of onset in %/° C. | 22 |
| Average coefficient of expansion between TMA onset 1 and $T_{100}$ in $K^{-1}$ | 0.12 |

EXAMPLE 2

Preparation of the $FeCl_3$/nitromethane Graphite Intermediate Intercalation Compound ($FeCl_3$/nitromethane GIC)

The graphite intercalation compound, containing the $FeCl_3$ and nitroethane as intercalate compounds, having with the expansion parameters given in Table 4 and obtained in the manner described, is obtained by the procedure of Example 1. in which, however, nitroethane is used instead of nitromethane.

TABLE 4

|  | $FeCl_3$/Nitroethane GIC |
|---|---|
| Onset (° C.) | 191 |
| Volume or sample weight in/mg | 365 |

TABLE 4-continued

|  | $FeCl_3$/Nitroethane GIC |
|---|---|
| Rate in region of onset in %/° C. | 9.59 |
| Average coefficient of expansion between TMA Onset 1 and $T_{100}$ in $K^{-1}$ | 0.07 |

EXAMPLE 3

Preparation of an $FeCl_3$/1-nitropropane Graphite Intercalation Compound ($FeCl_3$/1-nitropropane GIC)

The title compound, is obtained by the method of Example 1. in which, however, 1-nitropropane is used as intercalate compound and as solvent. The expansion parameters of this graphite intercalation compound, which were obtained in the manner described above, are given in the following Table 5.

TABLE 5

|  | $FeCl_3$/1 Nitropropane GIC |
|---|---|
| Onset (° C.) | 233 |
| Volume or sample weight in/mg | 134 |
| Rate in region of onset in %/° C. | 10.65 |
| Average coefficient of expansion between TMA Onset 1 and $T_{100}$ in $K^{-1}$ | 0.030 |

EXAMPLE 4

Preparation of a Graphite Intercalation Compound Containing $FeCl_3$/nitromethane and Sulfuric Acid ($FeCl_3$/nitromethane/sulfuric Acid GIC)

To begin with, 10 g (0.84 moles) of graphite are transferred to a 100 ml round-bottom flask and treated with 1 ml (0.01 mole) of a 30% hydrogen peroxide solution as oxidizing agent and 15 ml of sulfuric acid (95% to 97%) and the mixture is stirred for 3 hours at room temperature. Subsequently, the graphite is washed with water up to a pH of 3 to 4 and dried.

The $H_2SO_4/H_2O_2$ graphite (1 g, 84 mmoles), obtained in the manner described above, is added to a solution of 1.17 g (7.2 mmoles) of anhydrous $FeCl_3$ in 3 ml of nitromethane and the mixture is stirred for 20 hours at room temperature, then washed with a little nitromethane and dried.

The $FeCl_3$/nitromethane/sulfuric acid graphite intercalation compound, obtained in this way, has the expansion perimeters, which are given in the following Table 6 and were obtained in the manner described. As in the preceding examples, the expansion perimeters are measured on a graphite intercalation compound having a particle size of 250 to 400 µm.

TABLE 6

|  | $FeCl_3$/1 Nitromethane/$H_2SO_4$ GIC |
|---|---|
| Onset (° C.) | 160 |
| Volume or sample weight in/mg | 830 |
| Rate in region of onset in %/° C. | 81 |
| Average coefficient of expansion between TMA Onset 1 and $T_{100}$ in $K^{-1}$ | 0.22 |

EXAMPLE 5

Preparation of a FeCl₃/nitroethane/H₂SO₄ Graphite Intercalation Compound (FeCl₃/nitroehane/H₂SO₄-GIC)

The title compound is prepared by the procedure of Example 4. However, nitroethane is used as intercalation compound and solvent.

The expansion parameters of this compound at a particle size of 250 to 400 μm are listed in the following Table 7.

TABLE 7

|  | FeCl₃/Nitroethane/H₂SO₄-GIC |
|---|---|
| Onset (° C.) | 182 |
| Volume or sample weight in/mg | 364 |
| Rate in region of onset in %/° C. | 17.59 |
| Average coefficient of expansion between TMA Onset 1 and T₁₀₀ in K⁻¹ | 0.089 |

EXAMPLE 6

Preparation of a FeCl₃/1-nitropropane/H₂SO₄ Graphite Intercalation Compound (FeCl₃/1-nitropropane/H₂SO₄-GIC)

The title compound is prepared by the procedure of example 4. However, 1-nitropropane is used as an intercalation compound and solvent.

The expansion parameters of this compound at a particle size of 250 to 400 μm are listed in the following Table 8.

TABLE 8

|  | FeCl₃/1-Nitropropane/H₂SO₄-GIC |
|---|---|
| Onset (° C.) | 169 |
| Volume or sample weight in/mg | 291 |
| Rate in region of onset in %/° C. | 21.94 |
| Average coefficient of expansion between TMA Onset 1 and T₁₀₀ in K⁻¹ | 0.060 |

EXAMPLE 7

Preparation of a FeCl₃/nitromehane/H₂SO₄/HNO₃ Graphite Intercalation Compound (FeCl₃/nitromehane/H₂SO₄/HNO₃ CIG)

To begin with, 5 g (0.42 moles) of graphite are added to a 100 ml round-bottom flask and treated with 3.2 ml (0.07 moles) of nitric acid and 3.75 ml (0.07 moles) of sulfuric acid (95 to 97%). The mixture is then stirred for 1½ hours at room temperature, washed with water up to a pH of 3 to 4 and dried.

Subsequently, 1 g (84 mmoles) of the H₂SO₄/HNO₃ graphite, obtained in this manner, is reacted with nitromethane in the manner described in Example 4.

The expansion parameters of FeCl₃/nitromethane/H₂SO₄/HNO₃ graphite intercalation compound, with a particle size of 250 and 400 μm and obtained in this manner, are summarized in the following Table 9.

TABLE 9

|  | FeCl₃/Nitromehane/H₂SO₄/HNO₃ GIC |
|---|---|
| Onset (° C.) | 142 |
| Volume or sample weight in/mg | 313 |
| Rate in region of onset in %/° C. | 17.29 |
| Average coefficient of expansion between TMA Onset 1 and T₁₀₀ in K⁻¹ | 0.098 |

EXAMPLE 8

An acrylate dispersion on the basis of an n-butyl acrylate/vinyl acetate copolymer with a pH of 4 to 5 and a water content of 34 to 36% (Acronal V 271) in a stirred vessel is adjusted to a pH of 10 with ammonia using a dissolving stirrer. Subsequently, 18 grams of a fungicide, 12 g of a pigment disperser, 12 g of an emulsifier, 3.60 g of diisononyl phthalate as plasticizer and 108 g of monoethylene glycol as antifreeze are added. After that, 389 g of filler and 660 g of aluminum trihydroxide are mixed in as flame retardant additive using the dissolver and subsequently 209 g (6% by weight) of the FeCl₃-nitromethane graphite intercalation compound of Example 1 is added and mixed in thoroughly.

For producing the test specimen, a portion of the intumescing composition obtained is coated onto a substrate plate into an approximately 8 mm thick sheet. The sealing composition, together with the substrate plate, is dried for seven days at 23° C. and subsequently for seven days at 50° C. and cured. Test specimens are stamped out from the sheet obtained with the help of a mallet handle die and weighed.

Figure 3:
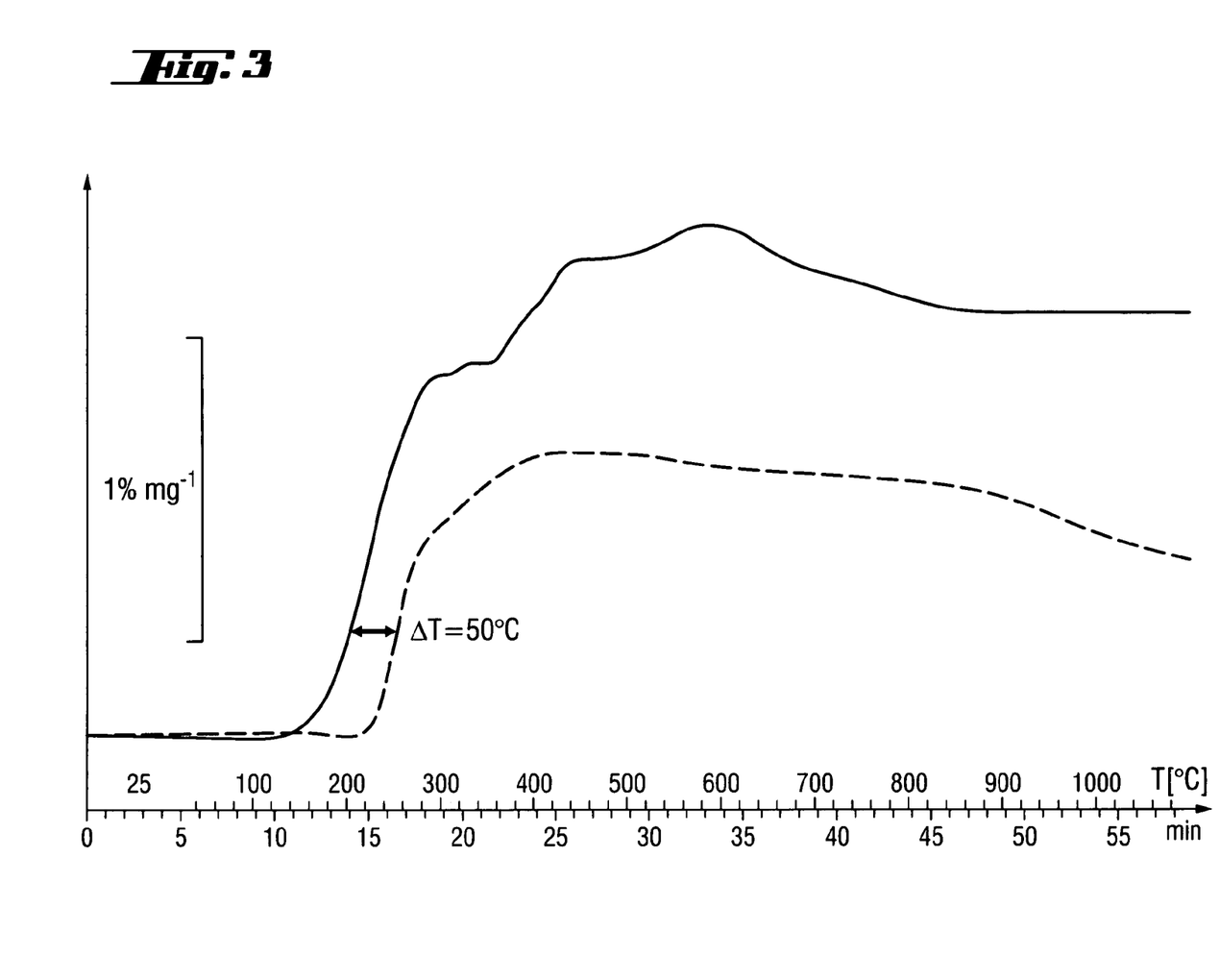
FIG. 3 shows the TMA curve of the fire-protection seal obtained according to Example 8 and FIG. 4 shows the TMA curve of the fire-protection seal obtained according to Example 9.

The test specimens are subjected to thermomechanical analysis (TMA) in the manner described above. The TMA curve of the acrylate-based fire-protections seal, obtained according to this example, is shown in FIG. 3 (solid line). For comparison, FIG. 3 shows the same fire protections seal, which was produced, however, with the properties given in Table one 1 using 6% by weight of commercial sulfuric acid graphite (broken line).

It can be seen readily that the expansion of the fire protection additive, which was produced according to the teachings of the present invention using the thermally expandable graphite intercalation compound containing the metal halide and the nitroalkane, in comparison to the commercial sulfuric acid graphite, is shifted by 50° C. to lower temperatures, the expansion volume being improved and the expansion rate being higher. With that, it can be seen that the inventive use leads to fire protections seals with surprisingly advantageous properties.

Furthermore, the improved expansion properties are also evident in a macroscopic experiment. For this purpose, a cured sample of the fire protections sealing composition (a disk with a diameter of 50 mm and a height of 3 mm), produced in the above manner by a method based on the guidelines of the DIBT for intumescing building materials, SVA: "Brandverhalten von Bauteilen (Burning Behavior of Building Materials) (November 1996) is placed under a load of 100 g in a cylindrical metal vessel and kept isothermally for 30 minutes at 600° C. Subsequently, the foam height, normalized to the sample weight, is measured. The foam heights of the fire protection sealing compositions are shown in Table 10 below.

TABLE 10

| Fire Protection Seal | Foam Height (mm/g) |
| --- | --- |
| 6% by weight of $FeCl_3$/nitromethane graphite | 2.82 |
| 6% by weight of commercial sulfuric acid graphite | 1.96 |

It is evident that the inventive fire protections seal leads to an increase in the foam height of more than 40%.

EXAMPLE 9

Figure 4:
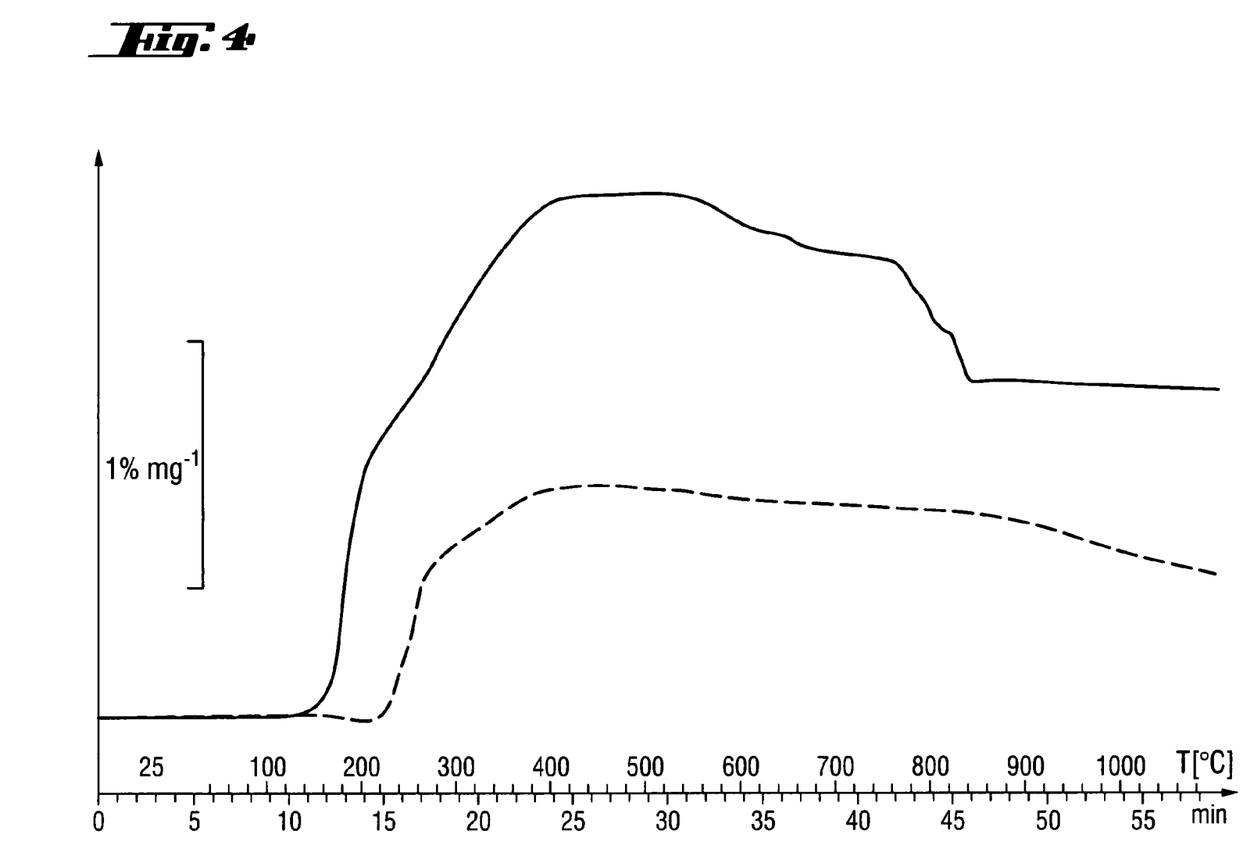

The procedure of Example 8 was repeated using the $FeCl_3$/nitromethane/sulfuric acid graphite intercalation compound of Example 4. The expansion properties of the inventive fire protection seal, obtained by thermomechanical analysis (TMA), are shown in FIG. 4, the expansion behavior of the inventive fire protections seal being shown by the solid line and that of the comparison fire protections seal, produced in the same way, however, using commercial sulfuric acid graphite as indicated in Table 1. being shown by the broken line. Once again, it can be seen that, due to the inventive use of a thermally expandable graphite intercalation compound containing a metal halide and a nitroalkane, the expansion is shifted by about 50° C. to lower temperatures.

The expansion properties of the inventive fire-protection seal and of the comparison fire-protections seal, determined by the macroscopic experiment given in Example 8. are listed in the following Table 11.

TABLE 11

| Fire Protection Seal | Foam Height (mm/g) |
| --- | --- |
| 6% by weight of $FeCl_3$/nitromethane graphite | 3.63 |
| 6% by weight of commercial sulfuric acid graphite | 1.96 |

In this case, the foam height of the fire-protection seal, produced pursuant to the invention, surprisingly is more than 80% higher than that produced by the comparison seal.

The invention claimed is:

1. A method of providing polymer matrices for producing intumescing fire-protective seals for through holes, wall bushings and other openings in wall, floors and/or ceilings of buildings, which comprises introducing a fire protection additive into a polymer matrix, wherein said additive is at least one thermally expandable graphite intercalation compound consisting of graphite and of the following intercalate compounds A), B) and C);
   A) at least one hydrate of at least one of the metal halides selected from the group consisting of $FeCl_3$, $AlCl_3$, $SbCl_5$, $YCl_3$, $CrCl_3$ and $NiCl_2$,
   B) at least one nitroalkane of the general formula $CH_3(CH_2)_nNO_2$, in which n is a whole number from 0 to 10, as well as its structural isomers or mixtures thereof, and
   C) at least one acid selected from the group consisting of sulfuric acid, acetic acid and nitric acid.

2. The method of claim 1, wherein the graphite intercalation compound contains nitromethane, nitroethane and 1-nitropropane or their mixtures as nitroalkane of group B).

3. The method of claim 1, wherein the graphite intercalation compound contains $H_2SO_4/HNO_3$, $H_2SO_4/CH_3COOH$ and/or $CH_3COOH/HNO_3$ as acid of the group C).

4. The method of claim 1, wherein the graphite intercalation compound has a particle size of 100 to 1500 μm.

5. The method of claim 1, wherein the graphite intercalation compound has a particle size of 125 to 1,000 μm.

6. The method of claim 1, wherein the polymer matrix is plastoelastic at room temperature and/or has a softening point of about 120° C.

7. The method of claim 6, wherein the polymer matrix comprises at least one representative selected from the group consisting of polyurethanes, plastoelastic polyurethanes, polyvinyl acetates, polyvinyl ethers, polyvinyl propionates, polystyrenes, natural or synthetic rubbers, silicones, poly (meth)acrylates and homopolymers and copolymers based on (meth)acrylates, acrylonitrile, vinyl esters, vinyl ethers, vinyl chloride and styrene.

8. The method of claim 7, wherein the polymer matrix contains poly(alkyl methacrylates), poly(alkyl acrylates), poly(aryl methacrylates), poly(aryl acrylates) and/or copolymers thereof with n-butyl acrylate, vinyl acrylate and/or styrene as polymer.

9. The method of claim 6, wherein the polymer matrix represents a mixture of an aqueous polymer dispersion D) and a low molecular weight, permanently plastic, liquid polymer E) in a weight ratio of D) to E) of 6:1 to 1:2.

10. The method of claim 9, wherein the aqueous polymer dispersion D) comprises at least one representative of the group consisting of polyurethanes, polyvinyl acetates, polyvinyl ethers, polyvinyl propionates, polystyrenes, natural or synthetic rubbers, poly(meth)acrylates, and homopolymers and copolymers based on (meth)acrylates, acrylonitrile, vinyl esters, vinyl chloride and/or styrene as polymer.

11. The method of claim 10, wherein the aqueous polymer dispersion D) contains poly(alkyl methacrylates), poly(alkyl acrylates), (poly(aryl methacrylates), poly(aryl acrylates) and/or copolymers thereof with n-butyl acrylate, vinyl acrylate and/or styrene.

12. The method of claim 9, wherein the water content of the aqueous polymer dispersion D) is 5 to 60% by weight and preferably 20 to 40% by weight.

13. The method of claim 10, wherein the aqueous polymer dispersion D) is contained in such an amount in the matrix composition, that the water content of the polymer matrix is 0.5 to 25% by weight.

14. The method of claim 13, wherein the water content is 1 to 10% by weight.

15. The method of claim 11, wherein the low molecular weight, permanently plastic, liquid polymer B) has a K value, determined according to the ISO 1628-1 of 9 to 50, or a molecular weight, derived therefrom, of 250,000 to 5,000,000, and a viscosity measured at 23° C. in a 50% solution in ethyl acetate by the method of DIN ISO 3219of 40 to 350 mPa·s.

16. The method of claim 9, wherein the low molecular weight, permanently plastic, liquid polymer B) comprises at least one representative selected from the group consisting of polyurethanes, polyvinyl acetates, polyvinyl ethers, polyvinyl propionates, polystyrenes, natural or synthetic rubbers, poly(meth)acrylates and homopolymers and copolymers based on (meth)acrylates, acrylonitrile, vinyl esters, vinyl ethers, vinyl chloride and/or styrene.

17. The method of claim 16, wherein the low molecular weight, permanently plastic, liquid polymer E) contains poly (alkyl methacrylates), poly(alkyl acrylates), poly(aryl methacrylates), poly(aryl acrylates) and/or copolymers thereof with n-butyl acrylate, vinyl acrylate and/or styrene as polymer.

18. The method of claim 1, wherein the graphite intercalation compound is introduced into the polymer matrix in an amount of 1% by weight to 75% by weight.

19. The method of claim 18, comprising the graphite intercalation compound in an amount of 3-30% by weight.

20. The method of claim 1, wherein the polymer matrix additionally contains fire-retarding additives having a ceramizing effect F1), having an ablative effect F2), having an intumescing effect F3), and/or having a flame-inhibiting effect F4) as additional, conventional additives F).

21. The method of claim 20, wherein the polymer matrix contains as a fire-protection additive F1) having a ceramizing effect a member selected from the group consisting of powdered glass, sintered glass, glass fibers, ammonium polyphosphate, zinc borate, kaolin, clay and/or bentonite, as fire-protection additive F2) having an ablative effect, aluminum hydroxide trihydrate, boehmite (AlOOH), magnesium hydroxide, zinc borate and/or calcium sulfate, as supplementary intumescing fire-protection additive F3), vermiculate, sodium, borosilicate, encapsulated sodium borosilicate, melamine polyphosphate, melamine cyanurate, ethylenediamine phosphate, guanidine, hydrazine and/or tris-2-hydroxyethyl cyanurate, and/or as flame retarding fire-protection additive F4), brominated phosphates, cylcoaliphatic, bromine compounds, aromatic bromine compounds and phosphate esters.

22. The method of claim 1, wherein the polymer matrix contains water, stabilizers, pigments and/or fillers as additional, conventional additives.

23. The method of claim 6, wherein the polymer matrix represents a mixture of an aqueous polymer dispersion D) and a low molecular weight permanently plastic, liquid polymer E) in a weight ratio of D) to E) of 4.3 to 3.4.

24. The method of claim 9, wherein the water content of the aqueous polymer dispersion D) is 20% to 40% by weight.

* * * * *